US006264006B1

(12) United States Patent
Hanson et al.

(10) Patent No.: US 6,264,006 B1
(45) Date of Patent: Jul. 24, 2001

(54) BRAKE FOR CASTERED WHEELS

(75) Inventors: James R. Hanson, Kalamazoo; Richard L. McDaniel, Constantine; Richard J. Bartow, Battle Creek; Geary A. North; Curtis A. Buiskool, both of Kalamazoo; Donald W. Gardiner, Plainwell, all of MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 09/454,114

(22) Filed: Dec. 3, 1999

Related U.S. Application Data

(62) Division of application No. 09/003,777, filed on Jan. 7, 1998.

(51) Int. Cl.[7] .................... B60B 33/00

(52) U.S. Cl. .................... 188/1.12; 5/86.1; 296/20

(58) Field of Search .................... 188/1.12, 20, 21, 188/22, 23, 29, 5, 6, 7, 8, 19, 2 F; 16/86.1, 600; 280/47.34; 296/20

(56) References Cited

U.S. PATENT DOCUMENTS

| | | | | |
|---|---|---|---|---|
| 3,304,116 | | 2/1967 | Stryker . | |
| 4,175,783 | * | 11/1979 | Pioth | 188/1 C |
| 4,276,962 | * | 7/1981 | Aulik | 188/29 |
| 4,922,574 | * | 5/1990 | Heiligenthal et al. | 188/1.12 |
| 5,279,010 | | 1/1994 | Ferrand et al. . | |
| 5,377,372 | * | 1/1995 | Rudolf et al. | 16/35 R |
| 5,450,639 | * | 9/1995 | Weismiller et al. | 188/1.12 |
| 5,806,111 | * | 9/1998 | Heimbrock et al. | 280/47.371 |
| 5,987,671 | | 11/1999 | Heimbrock et al. . | |

OTHER PUBLICATIONS

Stryker, "Advantages Stretchers", May 1994, 6 pp.

* cited by examiner

*Primary Examiner*—Robert J. Oberleitner
*Assistant Examiner*—Devon Kramer
(74) *Attorney, Agent, or Firm*—Flynn, Thiel, Boutell & Tanis, P.C.

(57) ABSTRACT

A wheeled carriage for supporting a patient in a substantially horizontal position, which wheeled carriage has thereon a patient support having head and foot regions and a pair of lateral side regions and a wheeled base supported at least by three floor surface engaging and castered wheels spaced from one another at locations defining corners of a theoretical polygon. An auxiliary wheel and a support structure therefor are suspendedly mounting the auxiliary wheel to the wheeled base. The auxiliary wheel is oriented inside a boundary of the theoretical polygon and includes an axle about which the wheel rotates. A control structure includes a first manually manipulatable member at at least one of the pair of lateral side regions and a second manually manipulatable member at at least one of the head end and the foot end so that an attendant can operate a selected one of the manually manipulatable members to effect a movement of the auxiliary wheel and the support structure therefor. In the alternative, the control structure can selectively activate the brakes for the wheeled carriage. A unitary pedal is provided for controlling the height of the patient support.

20 Claims, 8 Drawing Sheets

BRAKE FOR CASTERED WHEELS

This is a division of Ser. No. 09/003,777, filed Jan. 7, 1998.

FIELD OF THE INVENTION

This invention relates to a wheeled carriage for supporting a patient in a substantially horizontal position, and, more particularly, to a wheeled carriage having a unitary pedal control of brakes and a fifth wheel that can be raised and lowered by activation of one of the several control elements oriented around the perimeter of the wheeled carriage and a unitary pedal control of the height of the patient support.

BACKGROUND OF THE INVENTION

Wheeled carriages for supporting a patient in a substantially horizontal position are well-known in the art and a representative example of an early version of such a device is illustrated in Dr. Homer H. Stryker's U.S. Pat. No. 3,304,116, reference to which is incorporated herein. Dr. Stryker's innovative wheeled carriage included a fifth wheel which is raisable and lowerable by the attendant by directly manually manipulating the wheel support frame oriented beneath the patient supporting portion of the wheeled carriage. The orientation of the fifth wheel was sometimes awkward to reach and, therefore, made the operation of the raising and lowering feature of the fifth wheel difficult to attain.

Other structure was added to the wheeled carriage to facilitate an activation of the brakes for the wheels on the wheeled carriage from positions adjacent the head end and/or the foot end of the wheeled carriage. However, if the wheeled carriage were to be placed into a position where the head end and the foot end of the wheeled carriage were inaccessible to the attendant, operation of the brake became difficult without first moving the wheeled carriage to a position wherein at least one of the head and/or foot end of the wheeled carriage would be accessible for operation of the brake. If a fifth wheel is present and is deployed to its floor engaging position, situations where this might be considered a problem would be where an overbed table was to be placed in association with the wheeled carriage and the fifth wheel was blocking entry of the wheeled carriage of the overbed table beneath the wheeled carriage because of the presence of the lowered fifth wheel. Thus, it became a desire to provide an easily accessible fifth wheel and brake activation device oriented at least within the lateral side region of the wheeled carriage as well as within the head and foot regions of the wheeled carriage.

As wheeled carriages for supporting a patient further developed from Dr. Stryker's earlier patent, the mechanism for raising the patient support relative to the wheeled base generally included a pair of horizontally spaced hydraulic jacks which were simultaneously pumped with hydraulic fluid by operation of a single foot activated pedal. Once the hydraulic jacks had raised the patient support to the desired elevation, either the head end of the patient support, the foot end of the patient support or both ends of the patient support could be selectively lowered by activation of one or two foot activated pedals. For example, one foot activated pedal, when depressed, would activate a hydraulic fluid release valve for allowing hydraulic fluid to exit the hydraulic jack at one end of the bed so that that end of the bed would be lowered. The second foot pedal would accomplish the same task. When it was desired to lower both the head end and the foot end of the patient support at the same time, it was necessary for both foot pedals to be depressed at the same time. Attendants have found this difficult to achieve. Accordingly, it became a desire to provide for an easy to use mechanism for effecting the simultaneous lowering of the head end and foot end hydraulic jacks.

Accordingly, it is an object of this invention to provide a wheeled carriage for supporting a patient in a substantially horizontal position having a wheel braking and unbraking mechanism and/or an auxiliary wheel and support structure therefor mounted on a wheeled base, one and/or the other being actuatable by a manually manipulatable control element at at least one of the pair of lateral side regions or at least one of the head or foot ends of the wheeled carriage so that an attendant can operate the manually manipulatable control element to effect a movement of the auxiliary wheel solely from the head or foot end and solely from within the lateral side region.

It is a further object of this invention to provide brakes for the wheels of the wheeled carriage and a control mechanism for activating the brakes while the auxiliary wheel is in a position spaced from the floor surface and deactivating the brakes while the auxiliary wheel is in a floor engaging position, all utilizing the aforesaid same control mechanism.

It is a further object of this invention to provide a wheeled carriage, as aforesaid, wherein plural control elements are provided around the perimeter of the wheeled carriage to facilitate an attendant operating a selected one of the manually manipulatable control elements to effect a movement of the auxiliary wheel from its raised or lowered position and/or activation of a brake mechanism for the wheeled carriage solely from within a selected one of the head, foot and two lateral side regions of the wheeled carriage.

It is a further object of the invention to provide a control mechanism for actuating the raising and lowering feature of the fifth wheel and/or activation of a brake mechanism for the wheeled carriage by utilizing a rotational movement of the activating devices to facilitate compact construction of a rotary transmission device to interconnect the multiple locations for activating the raising and lowering of the fifth wheel feature and/or activation of a brake mechanism for the wheeled carriage.

It is a further object of the invention to provide a wheeled carriage, as aforesaid, wherein the manually manipulatable control element at each of the multiple locations around the perimeter of the wheeled carriage are identical to one another thereby standardizing the appearance of the control element to the attendant thereby minimizing confusion as to which of the many manually manipulatable elements on a wheeled carriage for supporting a patient in a substantially horizontal position is to be activated.

It is a further object of the invention to provide a wheeled carriage, as aforesaid, wherein the fifth wheel activating structure is durable and requires little or no maintenance over the lifetime of the wheeled carriage.

It is a further object of the invention to provide a wheeled carriage, as aforesaid, wherein the control element for activating the brakes and/or the auxiliary fifth wheel is a unitary pedal construction.

It is a further object of the invention to provide a wheeled carriage, as aforesaid, wherein hydraulic jacks are utilized to raise and lower the patient support relative to the wheeled base and wherein a unitary pedal construction is utilized to effect an independent lowering of the head end and the foot end of the patient support as well as a simultaneous lowering of both the head end and the foot end of the patient support.

SUMMARY OF THE INVENTION

The objects and purposes of the invention are met by providing a wheeled carriage for supporting a patient in a substantially horizontal position, which wheeled carriage has thereon a patient support having head and foot regions and a pair of lateral side regions and a wheeled base supported at least by three floor surface engaging and castered wheels spaced from one another at locations defining corners of a theoretical polygon. An auxiliary wheel and a support structure therefor are suspendedly mounting the auxiliary wheel to the wheeled base. The auxiliary wheel is oriented inside a boundary of the theoretical polygon and includes an axle about which the wheel rotates. A control structure includes a first manually manipulatable member at at least one of the pair of lateral side regions and a second manually manipulatable member at at least one of the head end and the foot end so that an attendant can operate a selected one of the manually manipulatable members to effect a movement of the auxiliary wheel and the support structure therefor. In the alternative, the control structure can selectively activate the brakes for the wheeled carriage. A unitary pedal is provided for controlling the height of the patient support.

BRIEF DESCRIPTION OF THE DRAWINGS

Other objects and purposes of this invention will be apparent to persons acquainted with an apparatus of this general type upon reading the following specification and inspecting the accompanying drawings, in which.

DETAILED DISCUSSION

Figure 1:
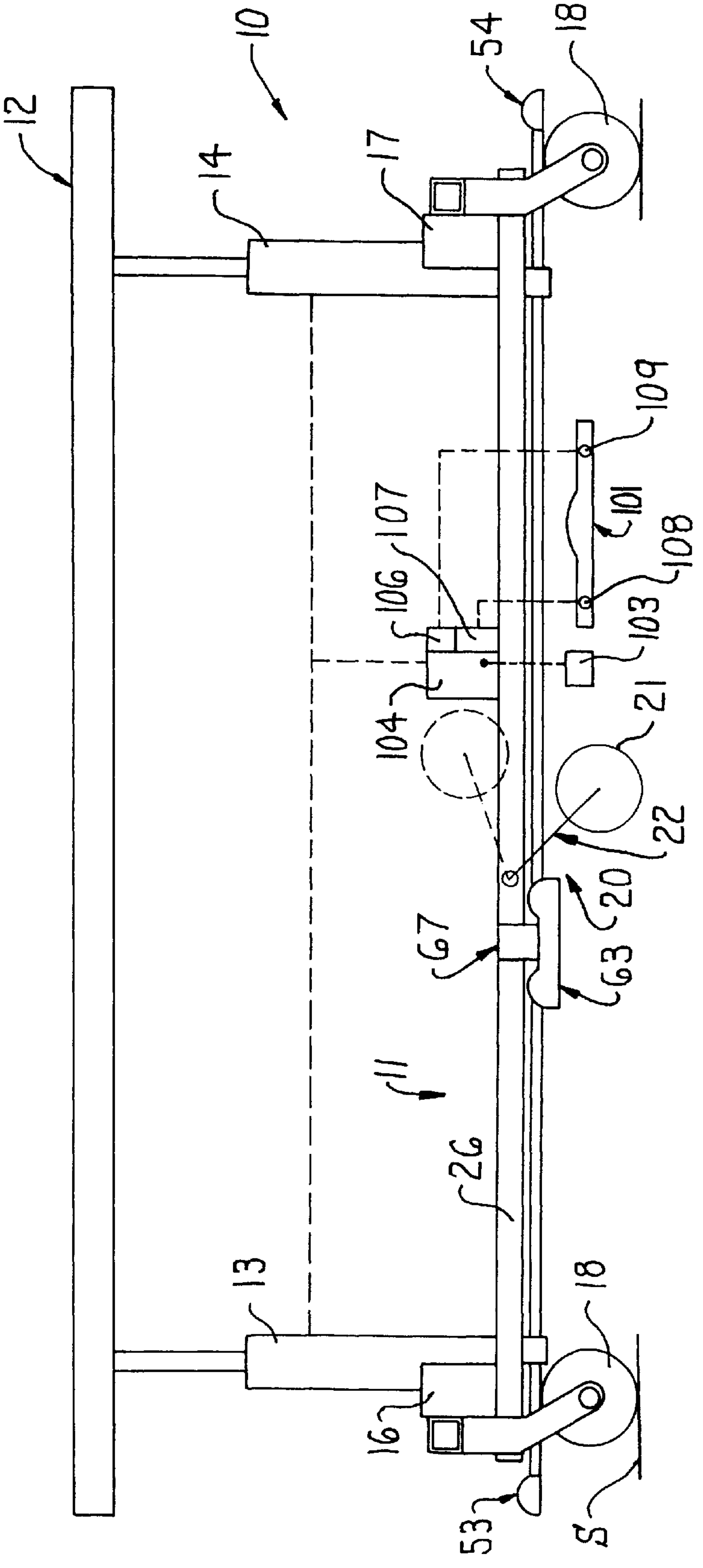
FIG. 1 is a schematic side view of a wheeled carriage for supporting a patient in a substantially horizontal position and embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar importance.

FIG. 1 is a schematic illustration of a wheeled carriage 10 for supporting a patient in a substantially horizontal position. A known wheeled carriage is disclosed in Dr. Homer H. Stryker's U.S. Pat. No. 3,304,116. The wheeled carriage 10 includes a wheeled base 11, a patient support 12 and a pair of hydraulically operated jacks 13 and 14 interposed between the wheeled base 11 and the underside of the patient support 12. The jacks 13 and 14 are mounted to the wheeled base 11 and are fixedly secured in place by brackets 16 and 17, respectively. A plurality of castered wheels 18 are provided on the wheeled base at the four corners thereof defining a theoretical polygon P, in this case, a rectangle. The orientation of the wheels 18 is similar to that illustrated in Dr. Stryker's aforementioned patent. All of the aforesaid structure is generally conventional and form the environment for the invention which will be discussed in more detail below.

An auxiliary fifth wheel mechanism 20 is provided on the wheeled base 11 and, in this particular embodiment, is oriented so that its plane of rotation is fixed and parallel to a longitudinal axis A of the wheeled base 11. The auxiliary fifth wheel mechanism 20 includes an auxiliary wheel 21 and a support structure 22 for interconnecting the auxiliary wheel 21 to the wheeled base 11. The support structure 22 includes a bracket 23 which is secured to the underside of a pair of longitudinally extending frame members 24 and 26 of the wheeled base 11. In this particular embodiment, the bracket 23 has a pair of downwardly extending flanges 27 and 28 through each of which is provided a hole 29 axially aligned with one another and adapted to relatively rotatably received therein a shaft 31 having a crank L-shaped crank arm 32 oriented at one end thereof. A cam follower 33 is rotatably mounted on the distal end of the L-shaped crank arm 32 as illustrated in FIG. 3.

The support structure 22 also includes an auxiliary wheel supporting frame 34 having a pair of parallel legs 36 and 37 thereby defining a wheel yoke. The auxiliary wheel 21 is rotatably mounted between the legs 36 and 37 of the yoke or frame 34. A pair of tubes 38 and 39 are preferably loose spacers but can be secured to the upper portion of the frame 34 and extend coaxially away from each other and sleevably receive therethrough the shaft 31. As a result of this construction, the frame 34 can rotate about the axis of and relative to the shaft 31. A torsion spring 41 interconnects the shaft 31 to the frame 34 so as to urge the frame 34 and the auxiliary wheel 21 mounted thereon toward the floor surface S (FIG. 1) inside the aforesaid theoretical polygon. A further torsion spring 42 is provided to interconnect the frame 34 to the bracket 23 and to continually urge the frame 34 and auxiliary wheel 21 toward a position out of engagement with the floor surface S, namely, and to the position illustrated in FIG. 3. Thus, an external force applied to the cam follower 33 will operate the crank arm 32 so as to initiate a rotation of the shaft 31 about its axis to move the frame 34 and the auxiliary wheel 21 thereon from the broken line position illustrated in FIG. 1 to the solid line position thereof and in engagement with the floor surface S against the force of the torsion spring 42. The structure for applying the external force to the cam follower 33 is described below.

Figure 2:
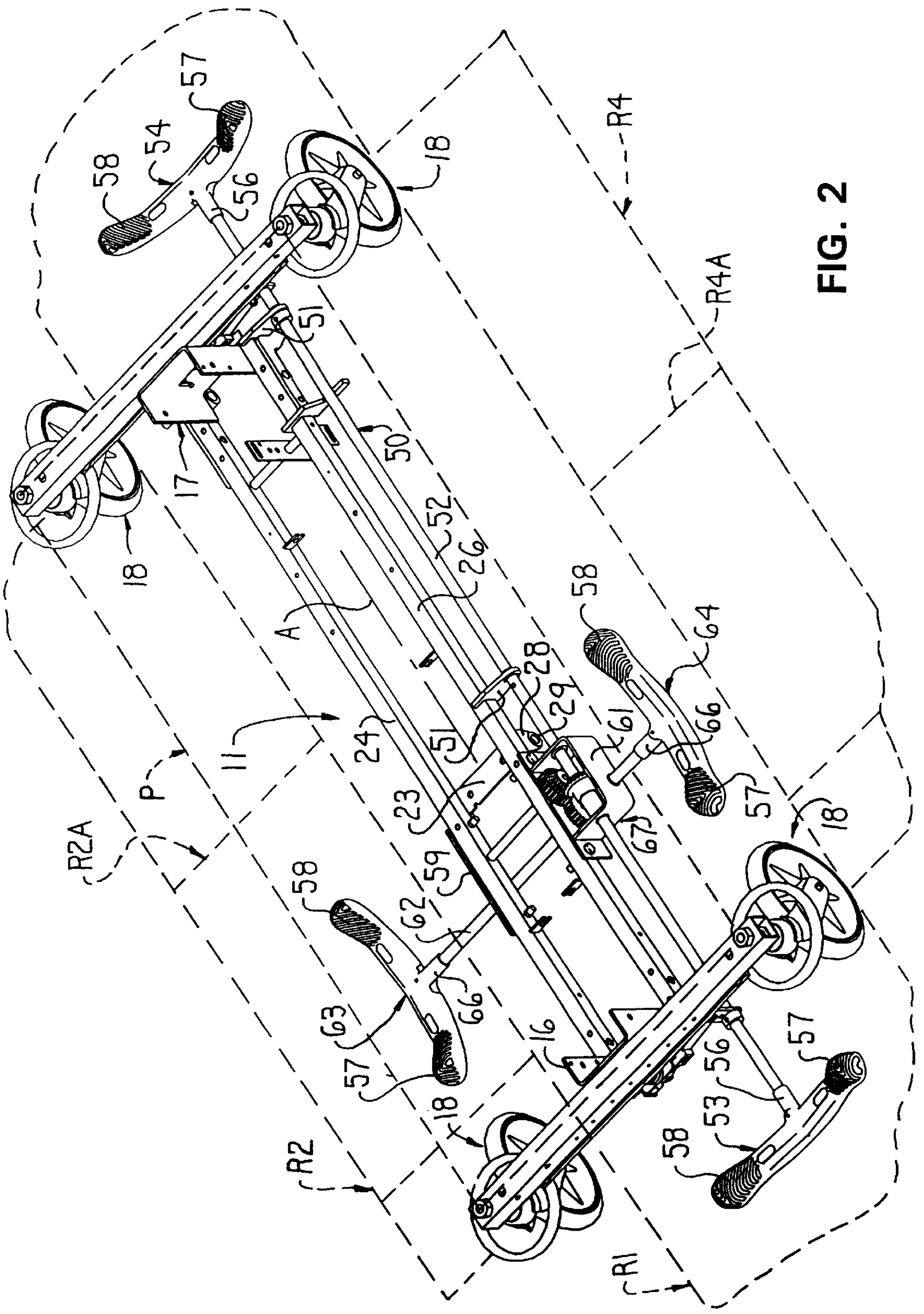
FIG. 2 is an enlarged isometric view of the wheeled base of the aforesaid wheeled carriage illustrated in FIG. 1 with the patient support structure having been removed.
Figure 3:
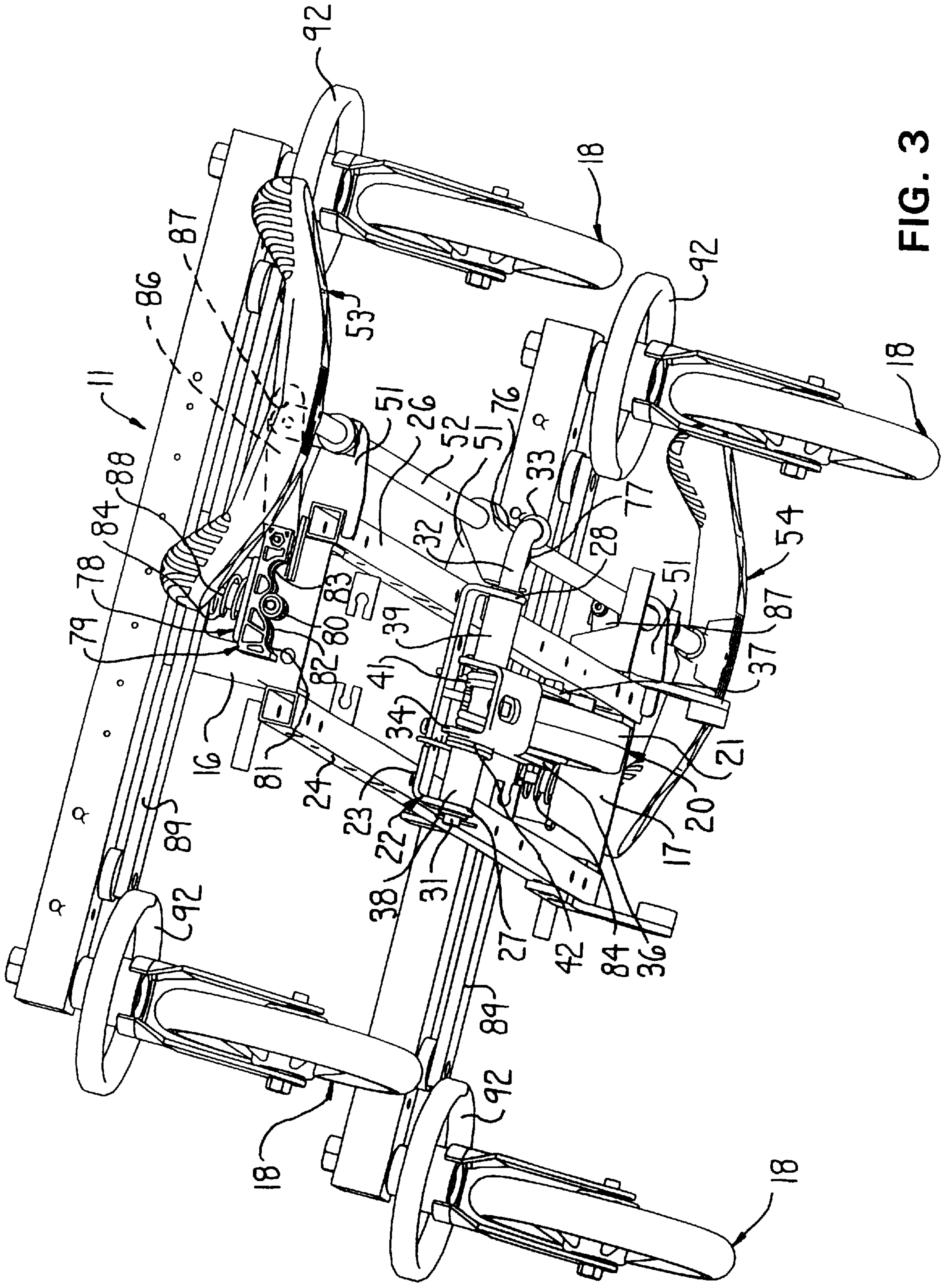
FIG. 3 is an isometric view of the underside of the wheeled base illustrated in FIG. 2 with the fifth wheel mounted in the central region thereof.
Figure 4:
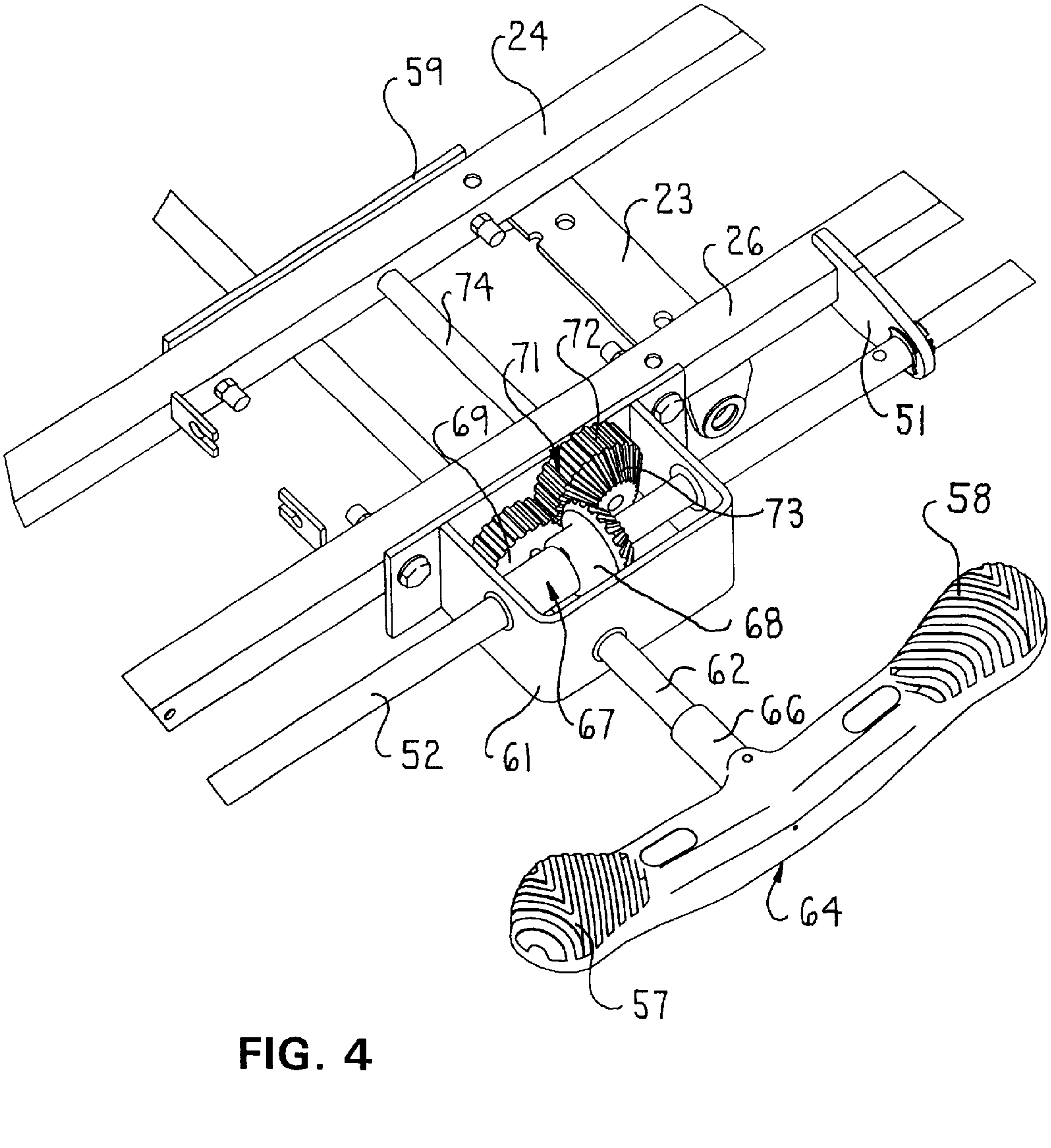
FIG. 4 is an enlarged isometric view of a fragment of FIG. 2.

The control structure 50 for applying the external force to the cam follower 33 for effecting movement of the support structure 22 and the auxiliary wheel 21 rotatably mounted thereon about the axis of the axle 31 is best illustrated in FIGS. 2–4. More specifically, a plurality of brackets 51 are secured to the frame 26 of the wheeled base 11 and rotatably support an elongated shaft 52 which projects beyond the head and foot ends of the wheeled carriage and into the head and foot end regions external to the aforesaid theoretical polygon. Foot pedals 53 and 54 are fixedly secured via a conventional structure 56 to the respective ends of the shaft 52. In this particular embodiment, each foot pedal includes a pair of separate foot pads 57 and 58 which, when depressed, effect a rotation of the shaft 52 in directions that are oppositely related to one another.

The control structure 50 additionally includes further brackets 59 and 61 for rotatably supporting a further elongated shaft 62. Each bracket 59 and 61 has a hole therethrough and is adapted to rotatably receive therein the aforesaid shaft 62. In this particular embodiment, the longitudinal axis of the shaft 52 and the longitudinal axis of the shaft 62 do not intersect. Instead, the axes of the respective shafts 52 and 62 lie in parallel horizontal planes while simultaneously the longitudinal axis of the shaft 62 lies in a plane that is orthogonally related to the plane in which lies the longitudinal axis of the shaft 52. Foot pedals 63 and 64 are fixedly secured as by conventional structure 66 to respective ends of the shaft 62. In this particular embodiment, the foot pedals 53, 54, 63 and 64 are identical and include respective foot pads 57 and 58.

FIG. 4 is an enlargement of a fragment of FIG. 2 and best illustrates a transmission device 67 which rotationally interconnects the shafts 52 and 62 to one another. More specifically, a beveled gear 68 is fixedly secured to the shaft 52 and is rotatable therewith. A spur gear 69 is fixedly secured to the shaft 62 and is rotatable therewith. An idler gear 71 includes a spur gear section 72 and a beveled gear section 73. The teeth of the spur gears 69 and 72 are intermeshed whereas the teeth of the beveled gear 68 and 73 are intermeshed. The idler gear 71 is rotatably mounted on a shaft 74 that is fixed to the frame members 24 and 26 of the wheeled base 11. As the result of the aforedescribed transmission device 67, rotation of the shaft 52 will effect a simultaneous rotation of the shaft 62. This means that if the attendant uses his/her foot to depress the foot pedal 57 on one of the four foot pedals 53, 54, 63 and 64, all of the foot pads 57 on all of the foot pedals will be simultaneously depressed.

The foot pedals 63 and 64 and the interconnecting shaft 62 and the support structure therefor have been purposefully omitted from FIG. 3 in order to provide an unencumbered view of the support structure 22 and the auxiliary wheel 21.

A contoured cam 76 (FIG. 3) having a contoured edge surface 77 is fixedly secured to the shaft 52 in a manner such that the contoured edge surface 77 engages the cam follower 33. Counterclockwise rotation of the shaft 52 (FIG. 3) will cause the contoured cam 76 to move therewith and cause the contoured edge surface 77 to apply the aforesaid external force to the cam follower 33 to operate the crank arm 32 and effect a rotation of the shaft 31 to cause the support structure 22 to move the auxiliary wheel 21 into engagement with the floor surface S. Rotation of the shaft 52 in the opposite direction of rotation will move the contoured cam 76 therewith and the torsion spring 42 will cause the cam follower to remain in engagement with the contoured edge surface 77 as the contoured cam 76 is moved in the aforesaid opposite direction.

Figure 5:
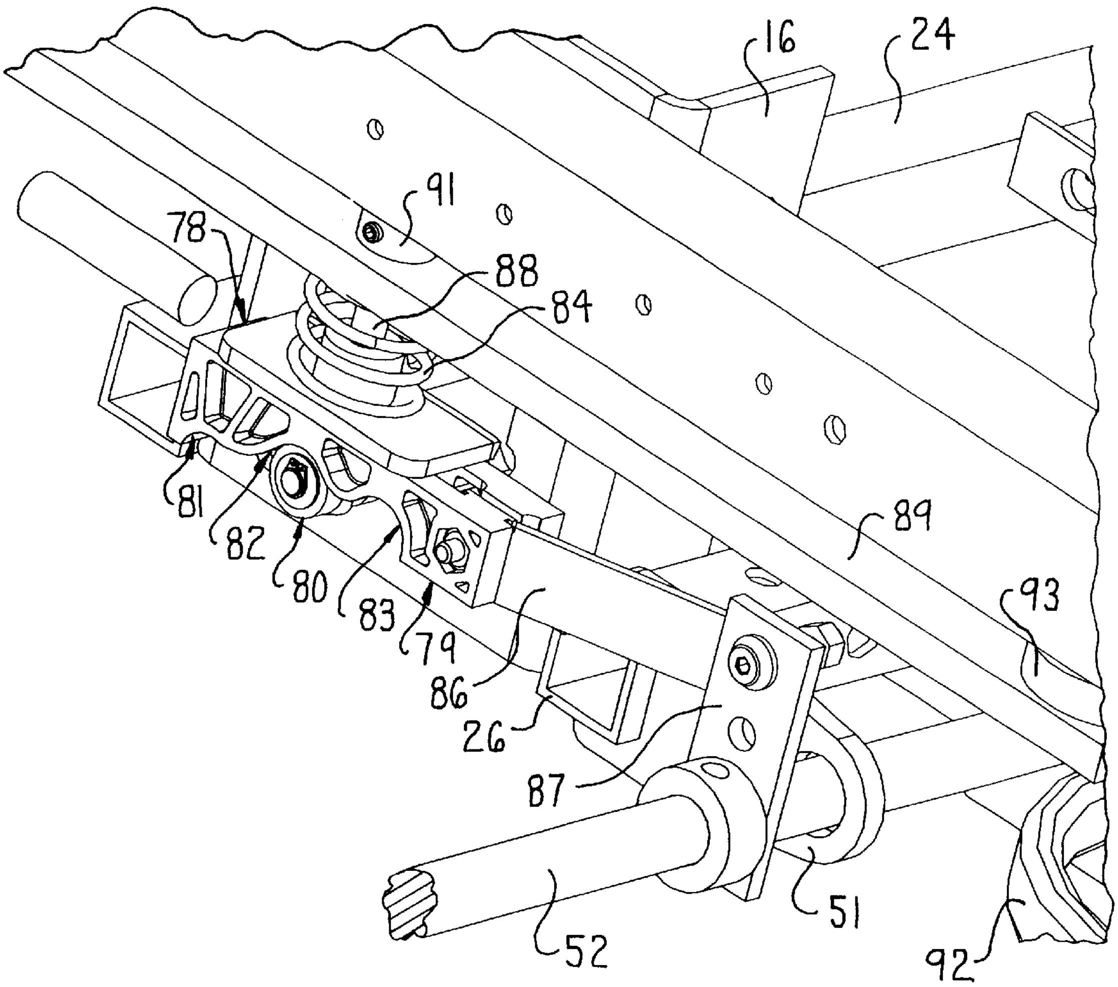
FIG. 5 is an enlarged isometric view of the brake activation structure.

Each of the brackets 16 and 17 on the wheeled base 11 have thereon structure that defines a guideway 78. Only one such guide way 78 is illustrated in the drawings and that illustration appears in FIGS. 3 and 5. The guideway 78 slidably supports a catch or slide mechanism 79 lengthwise of the guide way 78, here in a direction that is lateral to the longitudinal axis A. A latch in the form of a roller 80 is rotatably supported on the lower end of a vertically reciprocal rod 88 and is adapted to roll along a lower edge of the catch mechanism 79 between respective recesses 81, 82 and 83 in the aforesaid lower edge of the catch mechanism 79. The latch or roller 80 is capable of vertical movement against the continual urging of a compression spring 84, a lower end of which abuts the guideway 78 (FIG. 5). An upper end of the rod 88 passes through a hole (not shown) in a brake bar 89 and has a collar 91 secured thereto on a side of the brake bar 89 remote from the spring 84. A link 86 interconnects one end of the catch mechanism 79 to a lever arm 87 fixedly secured to the shaft 52 and is movable therewith. As a result, and referring to FIGS. 3 and 5, a clockwise rotation of the shaft 52 will not activate a deployment of the auxiliary wheel 21 but will, instead, cause the lever arm 87 to move therewith and apply a pulling force to the aforesaid one end of the catch mechanism 79 through the interconnecting link 86 to cause the roller 80 to roll on the edge of the catch mechanism 79 out of the central recess 82 and into the recess 81 while the compression spring 84 maintains the engagement of the contoured edge of the catch mechanism 79 with the roller 80. The rod 88 and the brake bar 89 will be pulled downwardly against the urging of the spring 84 to lower the rings 92 on the opposite ends of the brake bar 89 into engagement with the wheels 18 in a known manner. Deactivation of the brakes can be accomplished by a reverse rotation of the pedals and upward movement of brake bar 89 will occur, while bumpers 93 dampen unwanted metal to metal contact noise. A counterclockwise rotation of the shaft 52 (FIGS. 3 and 5) will cause the link 86 to push the catch mechanism 79 to the left and cause the roller to enter the recess 83. In this position, the auxiliary wheel 21 is deployed as described above. On the other hand, a movement of the roller 80 into the central recess 82 places the pedals 53, 54, 63 and 64 into a neutral position where neither the brakes nor the auxiliary wheel are deployed. The recesses 81, 82 and 83 of the catch mechanism 79 effect a holding of the foot pedals 53, 54, 63 and 64 in respective positions thereby necessitating an attendant applying force to a foot pad 57 or 58 in order to effect a rotation of the shaft 52 thereby causing a simultaneous rotation of the shaft 62 and corresponding movements of the remaining foot pedals.

The four regions R1, R2, R3 and R4 in which attendants are to stand when operating a selected one of the foot pedals 53, 54, 63 or 64 are shown in FIG. 2. The head and foot end regions R1 and R3 are most convenient for operation of the foot pedals 53 and 54 whereas the lateral side regions R2 and R4 are most convenient for operation of the foot pedals 63 and 64. Since the foot pedals 63 and 64 can be oriented anywhere along the lateral sides between the points of engagement of the wheels 18 with the floor surface S, the regions R2 and R4 are shown to be elongated in the longitudinal direction of the patient support 10 while in actuality the actual regions R2A and R4A more closely represent the actual regions in front of the respective pedals 63 and 64 that will be used by the attendants.

Figure 6:
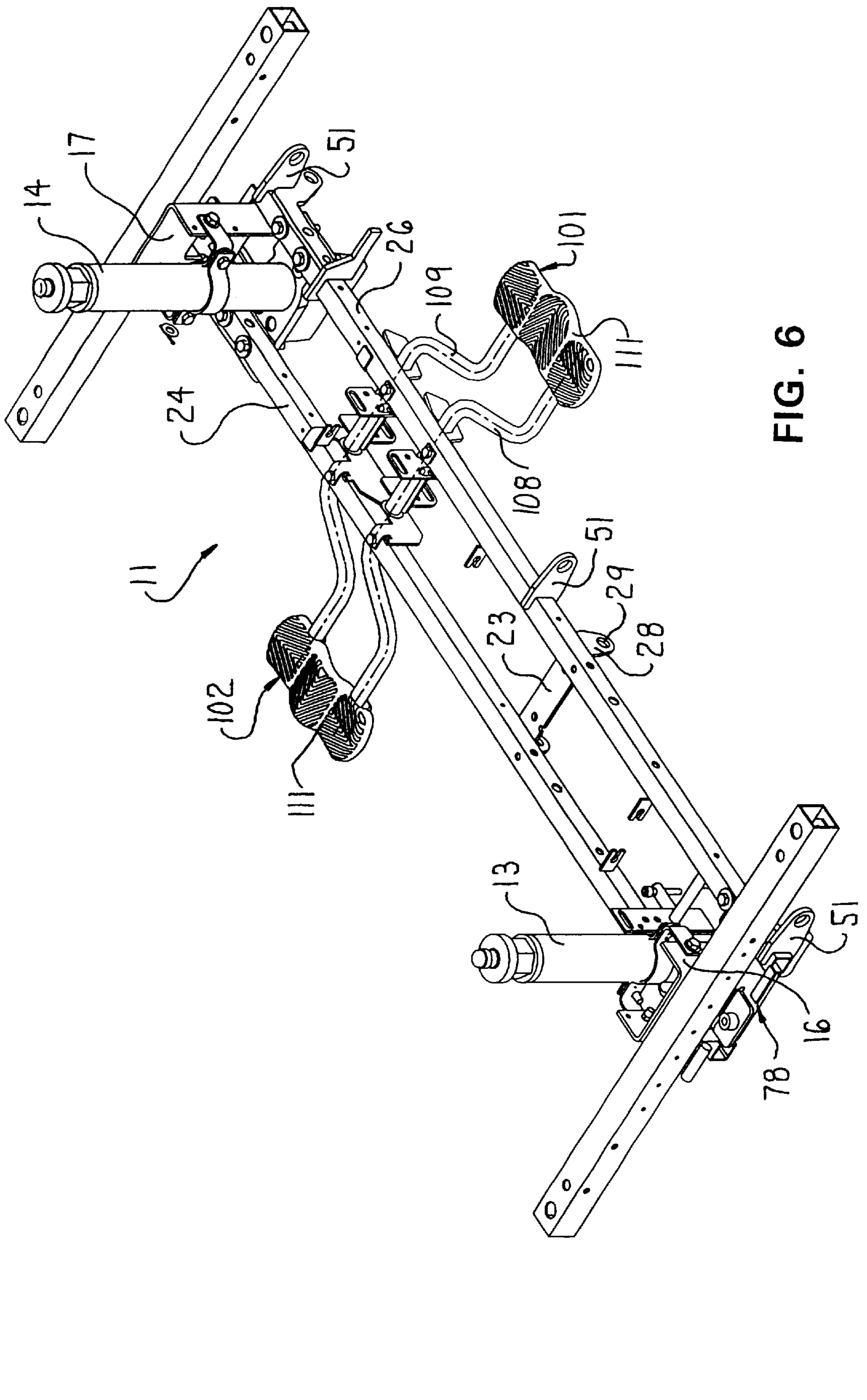
FIG. 6 is an isometric view of the wheeled base showing only the hydraulic jacks thereon and a unitary pedal construction for facilitating a control of the height of the patient support relative to the wheeled base.
Figure 7:
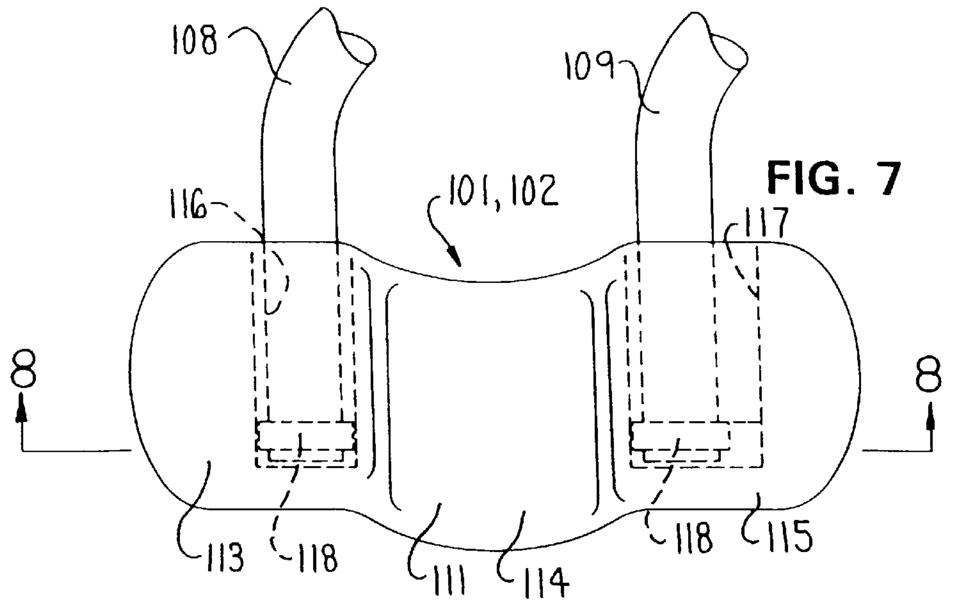
FIG. 7 is a top view of a unitary pedal, minus the tread configuration, used for controlling the height of patient support relative to the wheeled base.

FIG. 6 has been purposefully presented without the detail illustrated in FIGS. 2 and 3. The primary emphasis of FIG. 6 is to reference a pair of unitary pedal members 101 and 102. The pedal member 101 is also schematically illustrated in FIG. 1. Heretofore, and even now, a single pedal 103 (FIG. 1) has been utilized to activate a pump 104 to simultaneously supply the hydraulic cylinders 13 and 14 with hydraulic fluid to effect a raising of the patient support 12 relative to the base 11. Heretofore, separate foot pedals have been utilized to activate release valves 106 and 107 to effect a lowering of the hydraulic jacks 13 and 14 independently of one another. If both of the hydraulic jacks 13 and 14 were to be simultaneously lowered, the attendant was required to activate both foot pedals simultaneously to simultaneously activate the release valves 106 and 107 to cause a simultaneous lowering of the jacks 13 and 14. This often proved difficult for attendants due to the necessity of careful placement of the foot onto both foot pedals at the same time. This problem has been overcome by the provision of the aforesaid unitary pedal members 101 and 102. The pedal members are oriented on opposite lateral sides of the wheeled carriage 10 and are oriented outside the aforesaid theoretical polygon. A first rod 108 is rotatably secured to the frame members 24 and 26. A second rod 109 is also rotatably secured to the frame members 24 and 26 and extends parallel to the rod 108. Counterclockwise rotation of the rod 108 will effect a release of the release valve 107 to cause the hydraulic jack 13 at the foot end of the patient support to lower. Similarly, counterclockwise rotation of the rod 109 will activate the release valve 106 to cause a lowering of the hydraulic jack 14 at the head end of the patient support. Since the valving for such operation is known from Dr. Stryker's earlier mentioned patent, further discussion is deemed unnecessary.

Figure 11:
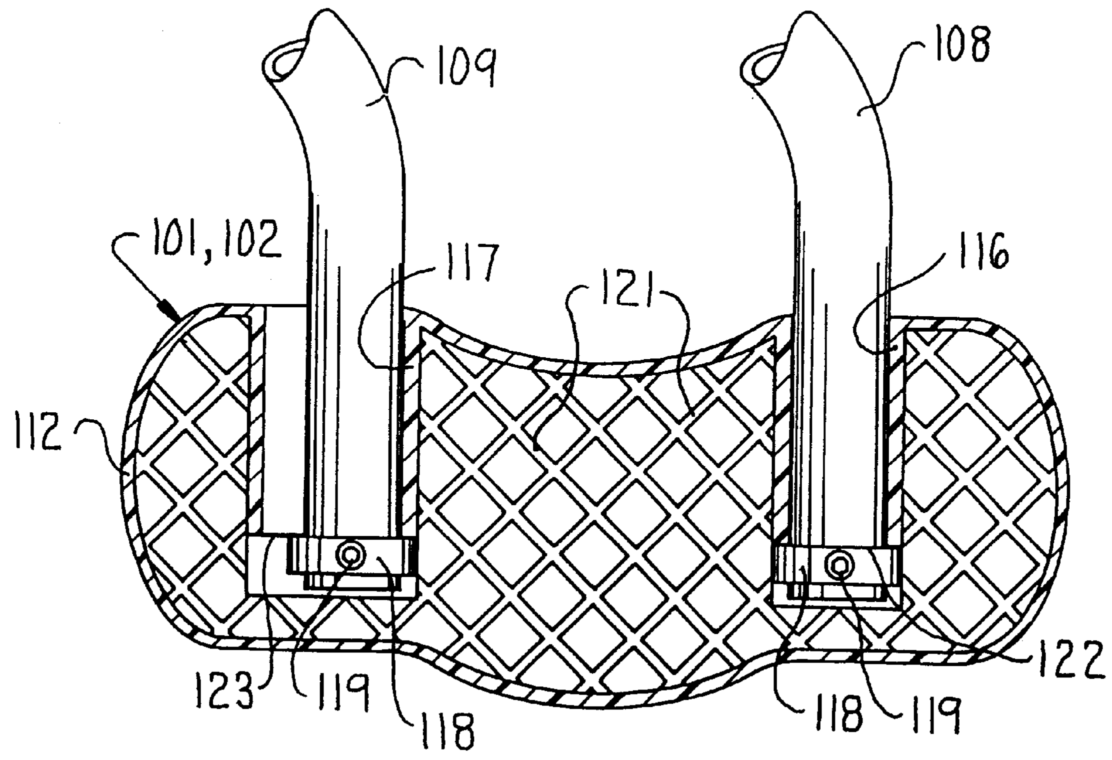
FIG. 11 is a bottom view of the unitary pedal.

Referring now to FIGS. 7–11 wherein a unitary pedal construction is illustrated, the pedals 101 and 102 are identical to one another and, therefore, only one thereof will be described below. The pedals 101, 102 are made of a thermoplastic material and include an upwardly facing plate-like section 111 with a tread-like surface thereon and having a downwardly extending skirt 112 around the perimeter thereof. The upwardly facing plate-like surface 111 is divided into three sections, namely, a left flat plate-like section 113, a central raised, somewhat dome-like section 114 and a right most flat plate-like section 115. A pair of sockets 116 and 117 are provided on the under surface of the plate-like upper surface 111. More specifically, the socket 116 is provided under the section 113 and receives therein the distal end of the rod 108. A collar 118 and rivet 119 are both secured to the rod 108 and abut against an edge surface 122 of the socket 116 as illustrated in FIG. 11. The width of the socket 116 corresponds to the diameter of the rod 108. The socket 117, on the other hand, is wider than is the socket 116 and receives therein the distal end of the rod 109. A corresponding collar 118 and rivet 119 are secured to the rod 109. The collar 118 secured to the rod 109 abuts against an edge 123 of the socket 117 as illustrated in FIG. 11. The aforesaid structure also prevents removal of the pedals 101 and 102 from the respective ends of the rods 108 and 109. If desired, ribbing 121 can be provided on the underside of each pedal in order to further rigidify the construction and as depicted only in FIG. 11.

Figure 8:
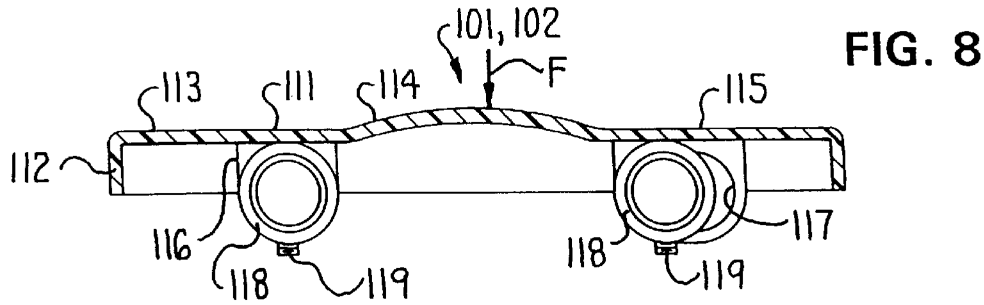
FIG. 8 is a sectional view taken along the line 8—8 of FIG. 7.
Figure 9:
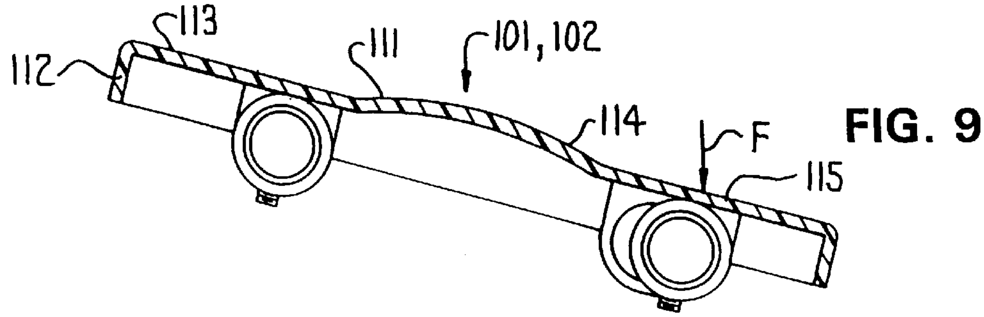
FIG. 9 is a sectional view taken along the line 8—8 of FIG. 7 and with side of the pedal being lowered.
Figure 10:
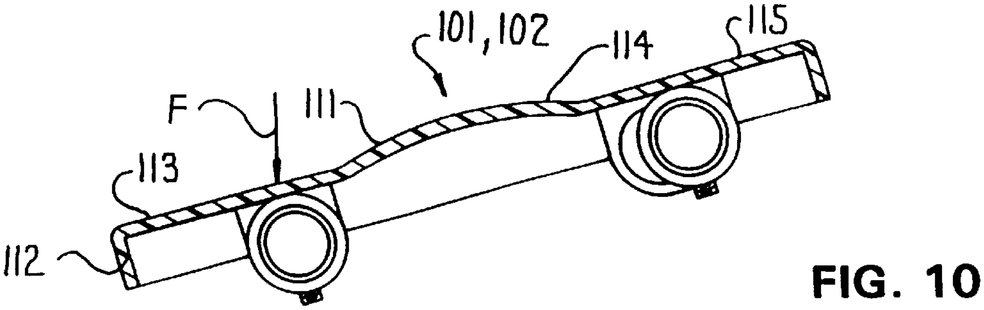
FIG. 10 is a sectional view taken along the line 8—8 of FIG. 7 and with the pedal being depressed on a side opposite the position illustrated in FIG. 9.

When it is desired to lower both hydraulic jacks 13 and 14 simultaneously, the attendant need only to place the foot on the central section 114 of each pedal of a pedal 101 or 102 and depress same. As a result, both rods 108 and 109 will be simultaneously rotated to cause a simultaneous activation of the release valves 106 and 107. This function is depicted in FIG. 8 with the arrow F representative of the attendant's foot being shown directly over the central section 114. When it is desired to lower the head end of the patient support, namely, the hydraulic jack 14, the attendant's foot is to be placed over the right section 115 illustrated by the arrow F in FIG. 9. Similarly, when the foot end of the patient support, namely, the hydraulic jack 13 is to be lowered, the attendant's foot need only be placed on the left section 113 and depressed as depicted by the arrow F in FIG. 10.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A wheeled carriage for supporting a patient in a substantially horizontal position, comprising:

a patient support having head and foot ends and a pair of lateral sides intermediate said head and foot ends and a wheeled based supported on at least four floor surface engaging and castered wheels;

brake means for braking and unbraking each of said floor surface engaging wheels, said brake means including a movable control means movable between a first position whereat said brake means brakes each wheel and a second position whereat said brake means is unbraked, said control means including a first control element oriented on an axis parallel to a longitudinal axis of said patient support and having a first manually manipulatable member connected to said first control element, said first manually manipulatable member being oriented adjacent at least one of said head and foot ends, a second control element oriented on an axis transverse to said longitudinal axis of said patient support and having a second manually manipulatable member connected to said second control element and oriented adjacent at least one of said pair of lateral sides, transmission means for drivingly interconnecting said first and second members and for effecting, when one of said first and second manually manipulatable members is manually operated, a simultaneous operation of the other of said first and second manually manipulatable members whereby an attendant can operate a selected one of said first and second manually manipulatable members from said at least one of said head and foot ends or from said at least one of said lateral sides to effect a braking or unbraking of said wheels.

2. The wheeled carriage according to claim 1, wherein said first control element includes an elongated and rotatably supported first member mounted on said wheeled base and extending into each of and between head and foot regions at the head and foot ends, a said first manually manipulatable member secured to each end of said first member; wherein said second control element includes an elongated and rotatably supported second member mounted on said wheeled base and extending transversely to said first member into each of and between lateral side regions at said lateral sides, and a said second manually manipulatable member secured to each end of said second member.

3. The wheeled carriage according to claim 2, wherein one of said first and second members includes at least one linkage member interconnecting said one of said first and second members to a first position of a multiple position releasable catch means for holding said one of said first and second members rotatably fixed until sufficient force is applied by the attendant to effect a release of said catch means and a rotative movement of said one of said first and second members to a further position whereat said at least one linkage member interconnects said one of said first and second members to a second position of said multiple position releasable catch means.

4. The wheeled carriage according to claim 3, wherein said multiple position releasable catch means includes an elongate slide member mounted in a guide on and for movement relative to said wheeled base, said slide member having spaced recesses along a length thereof, a latch movably mounted on said wheeled base and being received in a selected recess when said catch means is in said first position thereof, a spring interposed between said wheeled base and said latch to continually urge said latch toward said catch means and into a selected one of said recesses and yield when said slide member is moved lengthwise in said guide and said latch is removed against the urging of said spring from one recess and urged by said spring into an adjacent recess, said linkage member interconnecting said slide member to said one of said first and second members so that said slide member will be moved lengthwise of said guide in response to a rotative movement of said one of said first and second members.

5. The wheeled carriage according to claim 1, wherein said first manually manipulatable member oriented adjacent at least one of said head and foot ends is positioned between a spaced pair of said castered wheels.

6. The wheeled carriage according to claim 1, wherein said second manually manipulatable member oriented adjacent at least one of the pair of lateral sides is positioned between a spaced pair of said castered wheels at at least one of the pair of lateral sides.

7. The wheeled carriage according to claim 1, wherein said first and second manipulatable members comprise foot pedal members.

8. A wheeled carriage for supporting a patient in a substantially horizontal position, comprising:

a patient support having head and foot ends and a pair of lateral sides intermediate said head and foot ends and a wheeled base supported on at least four floor surface engaging castered wheels;

a brake apparatus for braking and unbraking each of said floors surface engaging castered wheels, said brake apparatus including a movable control device movable between a first position whereat said brake apparatus brakes each wheel and a second position whereat said wheels are unbraked, said control device including a first control element oriented on an axis substantially parallel to a longitudinal axis of said patient support and having a first manually manipulatable member connected to said first control element said first manually manipulatable member being oriented adjacent at least one of said head and foot ends, a second control element oriented on an axis transverse to said longitudinal axis of said patient support and having a second manually manipulatable member connected to said second control element and oriented at at least one of said pair of lateral sides; and a transmission for drivingly interconnecting said first and second manipulatable members, wherein manual operation of either one of said first and second manually manipulatable members effects a braking or unbraking of said wheels.

9. The wheeled carriage according to claim 8, said transmission effecting simultaneous operation of one of said first and second manually manipulatable members when the other one of said manipulatable members is manually operated.

10. The wheeled carriage according to claim 8, wherein said first and second manually manipulatable members comprise foot pedal members.

11. The wheeled carriage according to claim 8, wherein said first control element includes an elongated and rotatably supported first rod member mounted on said wheeled base and extending along the longitudinal axis of said rectangular patient support and having one end extending outwardly beyond one of the head or foot ends of the patient support, said first manually manipulatable member being secured to the outwardly extending end of said first rod member, and said second control element including an elongated and rotatably supported second rod member mounted on said wheeled base and extending transversely to said first rod member between and outwardly from the lateral sides of said patient support, a said second manually manipulatable member secured to each end of said second rod member.

12. The wheeled carriage according to claim 11, wherein said transmission drivingly interconnects said first and second manipulatable members through said first and second rod members.

13. A wheeled carriage for supporting a patient in a substantially horizontal position, comprising:

a patient support having head and foot ends and a pair of lateral sides intermediate said head and foot ends and a wheeled base supported on at least four floor surface engaging castered wheels;

a brake apparatus for braking and unbraking each of said floor surface engaging castered wheels;

a first manually manipulatable member connected to said brake apparatus, said first manually manipulatable member being oriented adjacent at least one of said head and foot ends;

a second manually manipulatable member connected to said brake apparatus and oriented adjacent at least one of said pair of lateral sides; and a transmission mechanism drivingly interconnecting said first and second manipulatable members, wherein manual operation of either one of said first and second manually manipulatable members effects a braking or unbraking of each of said castered wheels.

14. The wheeled carriage according to claim 13, wherein said brake apparatus includes a movable control device movable between a first position whereat said brake apparatus brakes each of said wheels and a second position whereat said wheels are unbraked, said control device including a first control element oriented on an axis substantially parallel to a longitudinal axis of said patient support, said first manually manipulatable member being connected to said first control element of said brake apparatus.

15. The wheeled carriage according to claim 14, wherein said control device includes a second control element oriented on an axis transverse to said longitudinal axis of said patient support, said second manually manipulatable member being connected to said second control element of said brake apparatus.

16. The wheeled carriage according to claim 13, wherein said first manually manipulatable member oriented adjacent at least one of said head and foot ends is positioned between a spaced pair of said castered wheels at the respective end thereof.

17. The wheeled carriage according to claim 13, wherein said second manually manipulatable member oriented adjacent at least one of said pair of lateral sides is positioned between a spaced pair of said castered wheels at the respective lateral side thereof.

18. The wheeled carriage according to claim 13, wherein said first and second manipulatable members comprise foot pedal members.

19. The wheeled carriage according to claim 13, said transmission mechanism effecting simultaneous operation of one of said first and second manually manipulatable members when the other one of said manipulatable members is manually operated.

20. The wheeled carriage according to claim 15, wherein said transmission mechanism drivingly interconnects said first and second manipulatable members through said first and second control elements.

* * * * *

UNITED STATES PATENT AND TRADEMARK OFFICE
CERTIFICATE OF CORRECTION

PATENT NO. : 6,264,006 B1 
DATED : July 24, 2001
INVENTOR(S) : James R. Hanson et al.

It is certified that error appears in the above-identified patent and that said Letters Patent is hereby corrected as shown below:

<u>Title page,</u>
Item [75], delete "; Curtis A. Buiskool, both of Kalamazoo; Donald W. Gardiner, Plainwell," and insert -- , Kalamazoo, --

<u>Column 9,</u>
Line 39, after "control element" insert -- , --

Signed and Sealed this

Thirteenth Day of August, 2002

*Attest:*

JAMES E. ROGAN

*Attesting Officer* *Director of the United States Patent and Trademark Office*